Feb. 25, 1969          G. HUSON          3,429,095
METHOD OF FORMING A PALLETIZED LOAD
Filed April 25, 1966                    Sheet 1 of 3

INVENTOR
GALE HUSON
By Edward R. Lowndes

Feb. 25, 1969 G. HUSON 3,429,095
METHOD OF FORMING A PALLETIZED LOAD
Filed April 25, 1966 Sheet 2 of 3

INVENTOR
GALE HUSON
By Edward R. Lowndes though as well as a method of and apparatus for forming

United States Patent Office 3,429,095
Patented Feb. 25, 1969

3,429,095
METHOD OF FORMING A PALLETIZED LOAD
Gale Huson, Palatine, Ill., assignor to Signode Corporation, Chicago, Ill., a corporation of Delaware
Filed Apr. 25, 1966, Ser. No. 544,918
U.S. Cl. 53—24    5 Claims
Int. Cl. B65b 63/02, 1/20, 13/02

ABSTRACT OF THE DISCLOSURE

A method of forming a palletized compressed load involving the surrounding of the load with an impervious sheet of plastic material, evacuating the interior of the enclosure to shrink the load in all directions and, while maintaining vacuum pressure, strapping the shrunk and enclosed load.

---

The present invention relates to a pre-shrunk palletized load as well as to a method of and apparatus for forming the same. Specifically, the invention is concerned with a vacuum baling method whereby a compressible commodity, such as a stack of paper sheets for example, may be compressed and consequently shrunk in volume by surrounding the same with a flexible vacuum barrier and then exhausting the interior of the barrier while simultaneously binding the thus shrunk package, together with a pallet support therefor, by the application of tensioned strapping thereto.

It is common practice to palletize a multiple-item load by stacking it on a skid or pallet and then, utilizing a hydraulic or other press, compress the load so as to reduce its height and, while compression of the load is maintained, encircle the load and at least portions of the pallet with one or more binder straps which serve to maintain the load compressed and with the pallet forming an integral and permanent part thereof to facilitate subsequent handling by a fork lift truck or the like. A substantial degree of success has been attained with such a method of palletizing certain types of loads but numerous problems arise when palletizing other types of load, particularly stacked sheets which are non-porous to the extent that paperboard is. Freshly stacked sheets of paperboard, as well as other similarly non-porous sheets, invariably entrap pockets of air therebetween and, therefore, unless such air pockets can be removed prior to the strapping operation, the completed package will be unstable in that as the stack stands and settles under its own weight, either in a static condition or under such vibratory conditions as may be encountered during shipment of the stack in a railway freight car or a truck, the binder straps become loosened and must be replaced or tightened. While some of the intervening air invariably is "squeezed out" immediately under the pressure of the press platen, and while a prolonged period of pressure application undoubtedly would result in complete exfiltration of substantially all of the entrapped air, the time factor is prohibitive where reasonably fast production is to be maintained.

Another problem confronts the successful compression strapping of shrinkage commodities, utilizing a power press for the shrinking operation. Despite press accuracy and alignment certain loads have a tendency to tilt or shift laterally under the compressive force of the press platen, this being due to the lateral shifting of the layers upon one another as a result of low frictional cooperation as well as of a floating action which is afforded by the aforementioned entrapped air. This shifting of the individual layers may give an ultimate parallelogram effect to the completed strapped package or it may result in individually displaced or offset layers having overhanging edge portions which become damaged by subsequent strap application.

Numerous economic limitations are attendant upon the use of power presses for compression strapping purposes and principal among these is the necessity for employing expensive rugged pallets or skids which will support the downward thrust of the platen. In an effort to squeeze out a large volume of the entrapped air, powerful presses have heretofore been devised and these require strong pallet supports, the cost of which is a function of the pressures involved.

One ingenious method of compensating for entrapped air has been devised, this method consisting in the inclusion in each package of an inflated balloon-like bag, which, as the entrapped air between and within the various layers slowly escapes over a period of time, expansion of the bag compensates for such loss of entrapped air and thus maintains the binder straps taut. Obviously such an expedient is costly both from the standpoint of labor involved and an increase in the unit price of each package.

It is recognized that the application of sub-atmospheric pressure to an envelope-shrouded package is notoriously old, particularly in the food industry where a permanently and hermetically sealed product is desired. A recent innovation in the package handling industry has been the "vacuum handling" of large packages where film-wrapped packages (including stacked materials) are subjected to a vacuumizing effect by a lift truck employing suction cups which register with evacuation holes or openings in the film so that when a high degree of suction is applied to the cups the package is shrunk and thus stabilized so that it may be lifted solely by its adherence to the suction cups. As soon as the vacuum is released the package is freed and the inrushing air restores the package to substantially its original dimensions. While many of the advantages that accrue from such a method are also inherent in the present compression strapping method, the present invention carries forward the shrinkage of compressible objects by vacuum means to the point where a completely strapped preshrunk package is made possible which will permanently maintain its reduced size and which is capable of being easily handled by conventional package-handling equipment. The invention further makes possible the compression strapping of packages containing commodities which do not respond to the application of press platen pressure, either because they will not withstand the high unidirectional pressure of the platen or because unidirectional compression thereof will distort their shape to the point where undesirable package dimensions will be obtained. The invention obviates all of the above-mentioned limitations that are attendant upon the conventional shrinkage and strapping of compressible commodities in that by practicing the same almost complete evacuation of entrapped air is accomplished within a very short period of time, well within the limits of rapid commercial strapping of successive packages; anti-friction considerations whereby there is slippage of one package layer upon another and consequent vertical misalignment of the layers is avoided; and the necessity of employing expensive heavy duty skids or pallet supports is eliminated.

In addition to the advantages briefly outlined above, the cost and size of the equipment needed for successful compression strapping by vacuumizing equipment is only a small fraction of the cost and size of conventional power press equipment.

Finally, according to the present invention, package handling operations are greatly facilitated. After the package has been shrunk and is ready for the strapping operation, package rotation for the application of multiple straps thereto may easily be accomplished since the package is exposed on all sides for passage of the strapping material therearound in any desired direction without press interference. Freedom of working space in the vicinity of packaging operations and a conservation of floor space are further considerations which have been borne in mind in the production and development of the present invention.

The provision of a method and apparatus such as has briefly been outlined above constitutes the principal object of the present invention. Other objects and advantages not at this time enumerated will readily suggest themselves as the nature of the invention is better understood.

In the accompanying three sheets of drawings forming a part of this specification, one illustrative embodiment of the invention has been shown.

Figure 1:
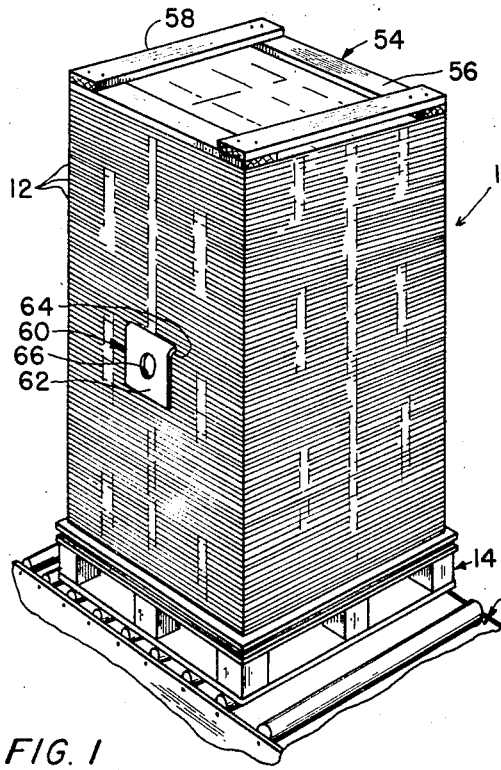
FIG. 1 is a perspective view of a palletized stack of articles showing the same positioned at an operating station preparatory to packaging thereof according to the present invention.

Referring now to the drawings in detail and in particular to FIG. 1, there has been disclosed in this view a stack 10 of individual articles 12, the stack being supported upon a special pallet assembly 14 which, in turn, is shown as being operatively disposed upon a roller conveyor 16 by means of which the stack may be moved horizontally to and from various operating stations.

The packaging method and apparatus of the present invention is applicable to the packaging of a wide variety of articles capable of being stacked, whether the articles are readily yieldable to compressional forces in only one direction or in all directions. The invention, as illustrated herein, is particularly useful in connection with the packaging of articles which, when stacked, offer little resistance to vertical compression and among such articles are rectangular sheets of flat folded paperboard carton blanks and other sheet material which has limited porosity. Highly successful results have been attained in the packaging of folded fertilizer and cement bags which, as they come off the stitching machine, contain an appreciable amount of entrapped air and which therefore are expanded in volume although they are in a flat condition. Such bags are admirably suited for packaging purposes according to the present invention and they are particularly difficult to package according to conventional methods employing a hydraulic press and therefore they have been selected for illustration and discussion herein. It will be understood however that a wide variety of other compressible products are contemplated for packaging by the method of the present invention.

Figure 2:
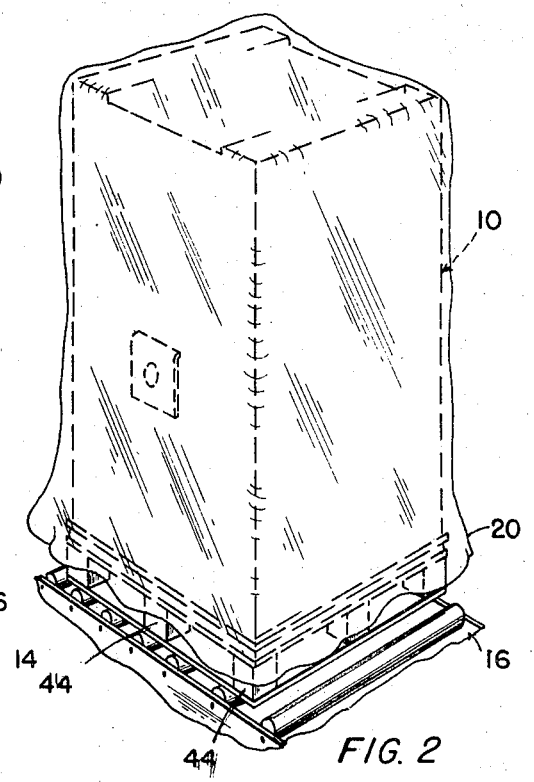
FIG. 2 is a perspective view similar to FIG. 1 illustrating the application of a vacuum barrier to the stack.

The stack 10 is of rectangular configuration and, in accordance with conventional stacking operations on such paperboard stacks, a quadrilateral arrangement of stacked components is employed. Briefly, in carrying out the method of the present invention a vacuum barrier in the form of a flexible envelope 20 having one open end is telescopically positioned over the stack as shown in FIG. 2 and thereafter the lower rim region of the envelope is drawn tightly about a portion of the pallet assembly 14, utilizing a draw string for this purpose. The opposed end regions of the draw string 22 are tucked into crevices provided for them and associated with the pallet assembly as will be described in detail presently, and when the envelope has thus been placed in substantially sealed relationship with respect to the stack, a stab-type vacuum chuck 24 is applied to the envelope and caused to puncture the same and make sealing engagement with the punctured opening. The vacuum chuck 24 is operatively connected through a flexible conduit 26 to a suction pump P (FIG. 10) which is driven by an electric motor M and by means of which air is evacuated from the interior of the stack-enclosing envelope 20, thus shrinking the envelope and its contained stack. It is characteristic of a shrinkable commodity that where resistance to compression in one direction is less than in another direction, a rapid decrease in the dimension of the article in such low-resistance direction will automatically take place when universal centripetal forces are applied to the article by an evacuation method such as has been described herein. Thus, in connection with the packaging of the flat sheets 12, upon initial evacuation of the package an immediate and appreciable decrease in the height of the package will take place. As a consequence, the high degree of vertical compression which is initially applied to the stack generally simulates the vertical compression which takes place when a conventional power press is employed. However, such vertical compression is not only more rapid but it is carried out to a greater degree inasmuch as before the compressive forces become fully effective, suction effects are applied to the four vertical sides of the stack tending to draw the air which is entrapped between adjacent layers within the stack so that the downward pressure which is exerted upon the stack does not encounter as much air as is the case when platen pressure is applied. Thus, with much of the air between adjacent layers of the stack being initially evacuated, the stack may be compressed to reasonably small proportions in much less time than it could be compressed when it is necessary to forcibly drive the air from between adjacent laminations. It is not contended that with the evacuation method of the present invention a shorter or less voluminous stack can be attained than could be attained with platen pressure, providing a prolonged pressure period were to be maintained. However, commercial packaging procedure involving the rapid successive packaging of articles in stacks precludes the use of long pressure cycles and it has been found that where tolerable time cycles are employed, complete evacuation of inter-layer air does not take place until after the strapping operation has been completed and the stack further settles during transportation and storage. This results in the loosening of the binding straps and consequent package instability.

After the envelope 20 has been evacuated as described above and while sub-atmospheric pressure is still being applied to the same, the strapping operation is resorted to. This strapping operation is conducted in a conventional manner, utilizing a suitable conventional strapping tool or machine such as the tool shown at 30 in FIG. 6 to apply straps 32 to the package. Preferably, but not necessarily, the vacuumized package is transferred to a strapping station for strapping purposes by shifting the same between stations on the conveyor 16, but if desired it is entirely feasible to perform the strapping operation at a single combined vacuumizing and strapping station. The use of separate stations enables an operator at the vacuumizing station to attend to the preparation of a replacement stack for subsequent vacuumizing while a second operator attends to the strapping of a previously vacuumized package.

It is essential that sub-atmospheric pressure be maintained upon the enclosed stack during the strapping operation and this maintenance of the stack in its shrunk condition during the strapping operation constitutes one of the principal features of the present invention. It is not practical to hermetically seal the envelope because large areas are involved and, furthermore, considering the fragile nature of the thin plastic skin which is established by the envelope, small punctures or ruptures such as may be inflicted upon the envelope during transfer from the vacuumizing station to the strapping station, or during handling of the package for purposes of rotating it at the strapping station to accommodate different directional strap placements, or during the actual strapping operation where a protrusion on the stack or an edge of the strapping may effect a small cut through the envelope, would destroy the vacuum effect and allow unwanted stack expansion to take place. For this reason perfect hermetic sealing of the envelope is not necessary or desirable and it is sufficient to establish a partial seal, the only requisite being that the seal be sufficiently effective that the rate of air evacuation will be appreciably greater than the rate of air infiltration through the sealing area and through any small openings which may inadvertently be created during handling of the package or of the strapping instruments. This maintenance of sub-atmospheric pressure within the envelope during the strapping operation is made possible by retention of the vacuum chuck 24 in position on the package with a full head of vacuum applied thereto until the last strap has ben applied. Since residual infiltration takes place immediately after the application of sub-atmospheric pressure is discontinued and is further enhanced by removal of the vacuum head, the completed and packaged stack is not hermetically sealed, although to render the package at least partially moisture impervious an adhesive patch such as has been shown at 34 may be applied over the opening which is established by the stab-type vacuum head 24.

Figure 4:
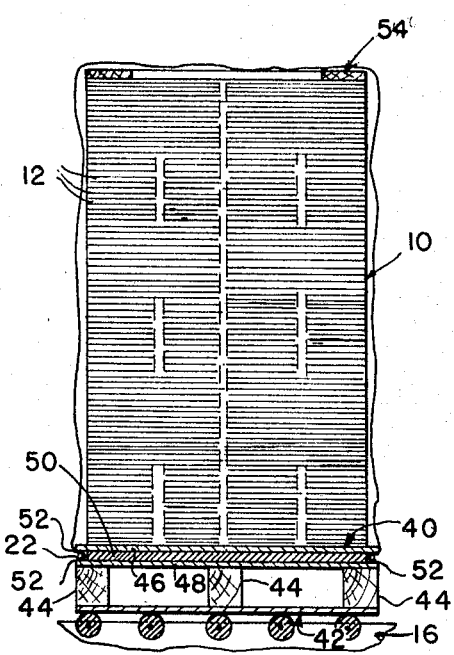
FIG. 4 is a sectional view taken substantially on the vertical plane indicated by the line 4—4 of FIG. 3 and in the direction of the arrows.

Considering now the method and apparatus of the present invention in greater detail, the pallet support 14 (FIG. 4) involves in its general organization an upper composite platform structure 40, and a lower platform structure 42, the two structures being maintained in spaced relationship by a series of nine spacer blocks 44 arranged in checkerboard fashion in longitudinal and transverse rows. The upper composite platform structure is comprised of identical upper and lower sheets 46 and 48 of relatively rigid laminated fibrous paperboard material of the type commonly referred to in the paperboard industry as "Meadboard," and an intermediate sheet 50 of slightly less transverse and longitudinal extent than the corresponding dimensions of the sheets 46 and 48. One of the characteristics of commercial Meadboard is that a sheet of such material will hold its edges under rather severe forces tending to disrupt the same and thus the three sheets 46, 48 and 50 establish a composite flat platform structure which is surrounded by a relatively durable continuous marginal groove 52 of slight depth and of a width equal to the thickness of the intermediate sheet 50. The lower platform 42 is comprised of a rectangular sheet of the Meadboard having dimensions commensurate with those of the sheets 46 and 48.

The upper and lower platforms 40 and 42 may be secured to the spacer blocks 44 in any suitable manner, preferably by the use of nails (not shown) which not only secure the platforms in position on the blocks, but also hold the three sheets 46, 48 and 50 of the upper platform 40 together in their face-to-face relationship.

Commercial Meadboard material being of a fibrous nature, as previously stated, has a certain degree of porosity and, therefore, in order to enhance the vacuum barrier effect which is required of the upper platform 40, the upper surface of the sheet 46 is coated with paraffin or other suitable sealant material.

In practicing the present method, the stack 10 is centered upon the upper platform 40 of the pallet structure 14 as shown in FIG. 1 and, upon completion of erection of the stack, a wooden frame structure 54 including longitudinal frame boards 56 and transverse frame boards 58 is positioned on the uppermost article 12 in the stack. A distributor element 60 consisting of a strip of paperboard material bent to provide a plate proper 62 and a lateral flange 64 is applied to a medial region of the front side of the stack 10 by interpositioning the flange 64 between adjacent layers of the articles 12. The plate proper 62 is formed with a circular central opening 66 therethrough for cooperation with the vacuum head 24 in a manner that will be made clear presently.

After the thus palletized stack 10 has thus been erected at the vacuumizing station, the envelope 20 is telescopically applied thereto as illustrated in FIG. 2. The envelope may be of any suitable configuration capable of enclosing the stack. One commercially available envelope which has been found entirely suitable for the present process consists of a two-sided structure of 2 mil polyethylene sheet material which is supplied in large rolls of serially connected units which are separated from one another by tear lines. Such a roll may be supported from an overhead dispenser and the individual bags or envelopes lowered in telescopic relationship upon successive stacks which are brought to the vacuumizing station on the conveyor 16.

Figure 3:
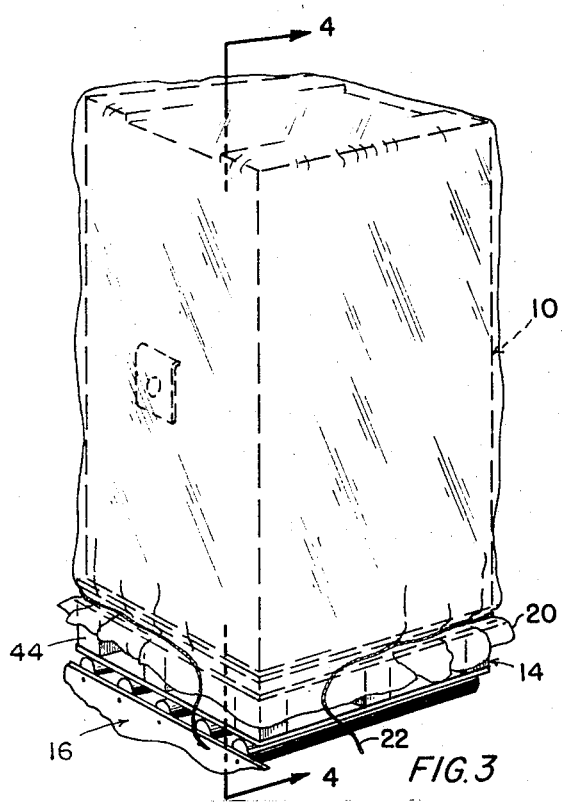
FIG. 3 is a perspective view similar to FIGS. 1 and 2, illustrating the manner in which the vacuum barrier is secured in position on the stack in partial sealing relationship with respect to the same so as to establish an internal chamber capable of undergoing vacuumizing.

After the envelope 20 has been telescopically positioned over the stack 10 and the lower rim region of the envelope caused to encircle at least the upper region of the pallet structure 20, the previously mentioned draw string 22 is passed around the envelope and aligned with the continuous groove 52 which extends around the periphery of the upper composite platform 40 of the pallet structure so that the tightening of the draw string will serve to draw or tuck the material of the envelope into such groove as clearly illustrated in FIG. 3. The free end regions of the draw string need not be tied together as is customary with many draw string installations but instead they may be tucked into the groove along with the material of the envelope, this expedient resulting in a saving of time and representing a convenient means of disposing of such end regions. At this point in the method, the stack, together with the upper frame member 54 is completely enclosed by a vacuum barrier consisting of the envelope 20 and the paraffin coated upper platform 40 of the pallet structure 14.

It should be noted that the longitudinal and transverse dimensions of the upper platform 40 of the pallet structure 40 are slightly greater than the corresponding dimensions of the lowermost layer of articles in the stack 10 so that the extreme peripheral regions of the platform 40 slightly overhang the side edges of the stack. This dimensioning of the platform 40 results in functional advantages which are associated with both the vacuumizing and the strapping operations and which will be described presently.

Figure 5:
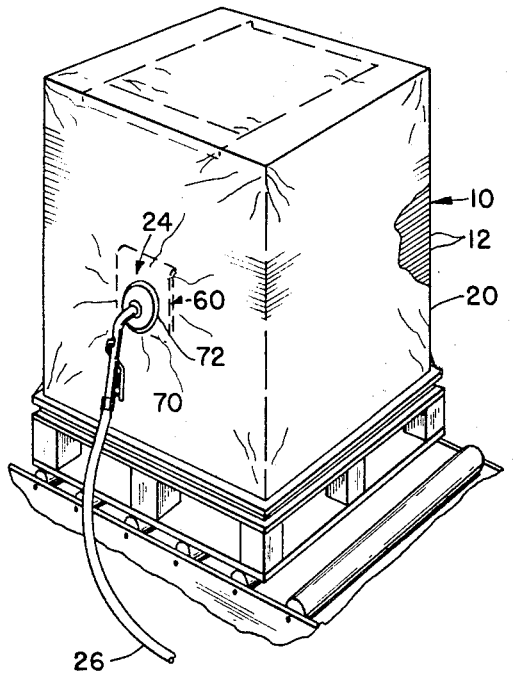
FIG. 5 is a perspective view similar to FIGS. 1 to 3 inclusive and illustrating the manner in which the partially completed package is evacuated preparatory to the strapping operation.

The thus erected and enclosed stack 10 is at this point in the method ready for evacuation of air from the interior of the envelope 20. Although numerous types of vacuum chucks may be found suitable for use in connection with the present method, the preferred form of chuck has been illustrated in FIGS. 5 and 10 and includes a rigid tubular handle portion 70 which communicates with a vacuum head 72. The vacuum head is comprised of a backing ring 74 on which there is seated a flexible elastomeric suction cup 76 of shallow dished configuration and which presents a flexible rim region 78. The backing ring 74 is suitably secured to a collar 80 which is fixedly secured to the handle portion by a press fit or otherwise and the latter projects through aligned openings in the three elements 80, 74 and 76 and terminates within the confines of the suction cup. The distal or forward end of the tubular handle portion 70 is formed with a forwardly projecting semi-cylindrical knife-like extension 78 and also with a series of circumferentially arranged spaced apertures 80 therearound. The forward rim of the tubular handle portion 70 is so designed that when the suction cup 76 is forcibly thrust against the side of the envelope-enclosed package the arcuate knife-like extension 78 will initially puncture the envelope 20 by slitting the same on a curved bias, thus creating a flat in the envelope at the region of puncture. This flap is adhered to the main body of the envelope by a narrow web and the flap is thus captured and held to the envelope so that it is prevented from being drawn through the handle 70 and conduit 26 into the suction side of the pump where, otherwise, it might cause clogging of the pump inlet. The flexible conduit 26 is operatively connected to the handle 70 by a suitable threaded fitting 82.

Figure 10:
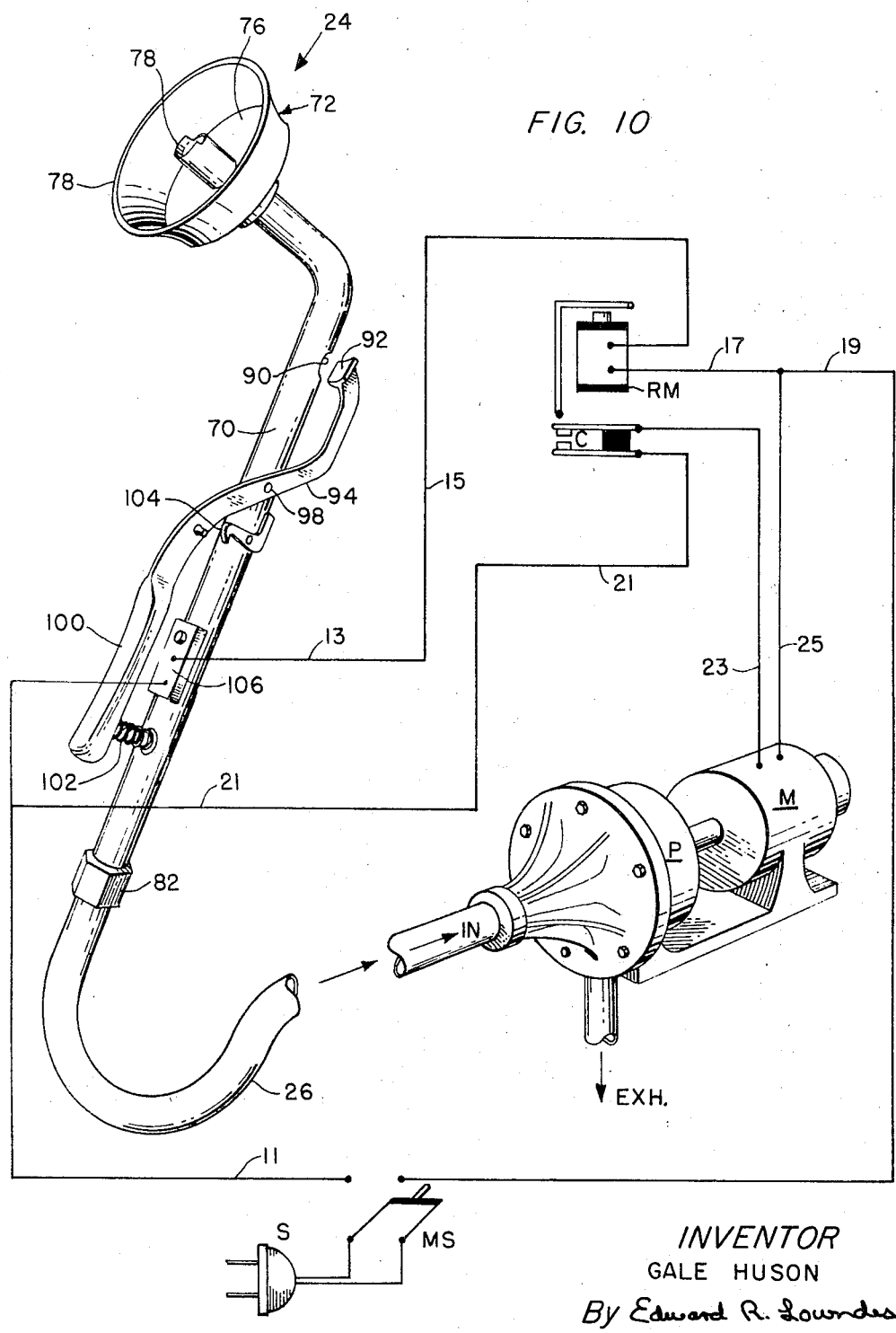
FIG. 10 is a schematic view illustrating the operation of a preferred form of vacuumizing equipment employed in connection with the present invention and embodying an electrical circuit diagram for such equipment.

The vacuum chuck 24 has associated therewith certain semiautomatic mechanism by means of which initial evacuation of the package and subsequent strapping of the evacuated package may be conveniently performed, a single operator sufficing for these operations. Accordingly, as shown in FIG. 10, a normally open bleed opening 90, is formed in the wall of the handle portion and is adapted to be closed by a valve 92 carried on a lever 94 which is pivoted on a pin 98 for rocking movement with respect to the handle 90. The valve stem 94 terminates in a depressible grip portion 100 which is spring pressed as at 102 in a direction tending to normally maintain the valve 92 in its open condition so that the initial application of the vacuum chuck to the package will not be effective immediately to draw a vacuum within the package. However, after the envelope has been initially punctured by the arcurate knife-like extension 78 and the suction cup 76 seated upon the envelope in surrounding relation with respect to the punctured opening, the operator may depress the grip portion 100 and thus cause the valve 92 to close the opening 90 so that the suction pump P will be effective on the interior of the package. A latch arrangement 104 serves to latch the valve in its closed position.

Upon such initial depression of the grip portion 100, the normally open contacts associated with a microswitch 106 will become closed and establish an electric circuit through the relay-actuated electric motor M which drives the pump. Upon closure of such contacts, current will then flow from a suitable source S such as a commercial power line, through a previously closed master switch MS, lead 11, micro-switch 106, leads 13, 15, the winding of a relay magnet RM, leads 17, 19, and master switch MS, back to the source S. Energization of the magnet RM will cause closure of a pair of contacts C, whereupon the motor circuit will become closed, this circuit extending from the source S, through the switch MS, leads 11, 21, contacts C, lead 23, electric motor M, leads 25 and 19, and master switch MS back to the source.

Since the latch arrangement 104 serves to maintain the grip portion 100 depressed, the valve 92 remains in its closed position and the contacts of the microswitch 106 remain closed so that sub-atmospheric pressure will be maintained upon the package until such time as the latch arrangement 104 is released by the operator. The provision of the latch arrangement 104 enables a single operator to attend to both the evacuation of a package and the subsequent strapping thereof. When a fresh stack 10 is brought to the vacuumizing station, it is merely necessary for the operator to apply one of the envelopes 20 thereto in the manner previously described, after which he may depress the handle portion 100 of the valve stem 94 to thus close the valve 92 upon the opening 90 and cause suction to be maintained upon the vacuum head 72. Thereafter, with the opening 66 of the distributor element 60 as a target, the operator will then "stab" the envelope 20 so that the cutting end of the handle portion 70 of the vacuum chuck 24 punctures the envelope and enters the opening 66 while the suction cup 76 seats upon the envelope and surrounds the punctured opening. After the evacuation of the envelope has been completed, and with the vacuum chuck still in position so that sub-atmospheric pressure remains effective upon the shrunk package, the operator may transfer the same to the strapping station and perform the strapping operation.

Figure 6:
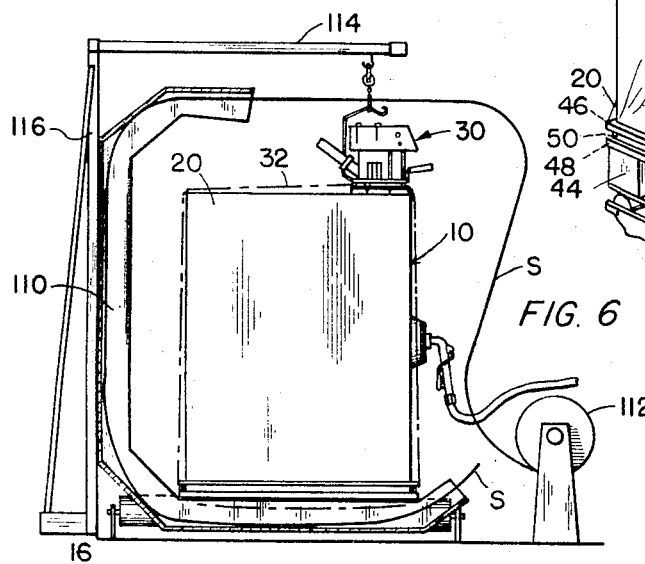
FIG. 6 is a side elevational view, partly in section and entirely schematic in its representation, illustrating the manner in which the vacuumized package is strapped at a strapping station.
Figure 8:
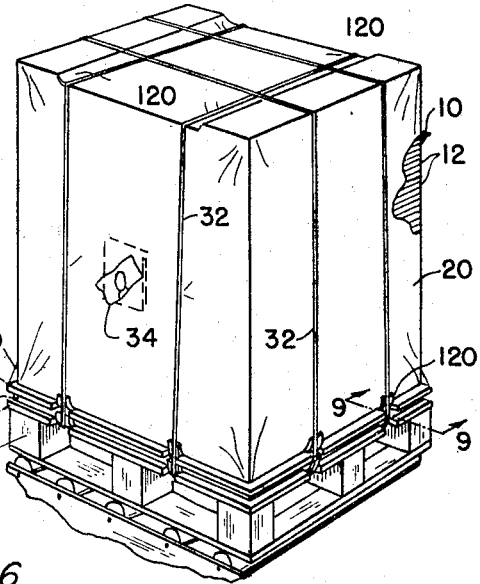
FIG. 8 is a perspective view of the completely preshrunk and strapped package.

As previously stated, the strapping tool 30 may be of any conventional type such as any one of numerous Signode hand tools. Conventional facilities may be provided for performing the strap-application to the preshrunk package and, accordingly, a strap chute 110 (FIG. 6) may be provided for guiding the strapping S from a suitable dispenser 112 around the package. The strapping tool 30 may conveniently be supported from an overhead hanger 114 mounted on a standard 116. The strap-handling mechanism shown in FIG. 6 is merely exemplary of one form of mechanism which is suitable for performance of the strapping operation upon the vacuumized package and it will be understood that various other arrangements may be employed if desired. In employing such strapping equipment, any desired strap placement on the package may be resorted to but, in the exemplary strapped package four straps 32 are applied to the package, two of the straps extending longitudinally around the package and the two other straps extending horizontally around the same. The straps 32 are tensioned in the usual manner and, after tensioning thereof, the overlapping end regions thereof are secured together by seals 120 and, finally, the free end region of the strapping is severed from the package to free the latter from the dispenser. The arrangement of the nine quadilaterally positioned spacer blocks 44 associated with the pallet assembly 14 is such that this placement of straps is entirely feasible, the strapping passing beneath the upper composite platform 40 and between adjacent blocks 44.

Figure 9:
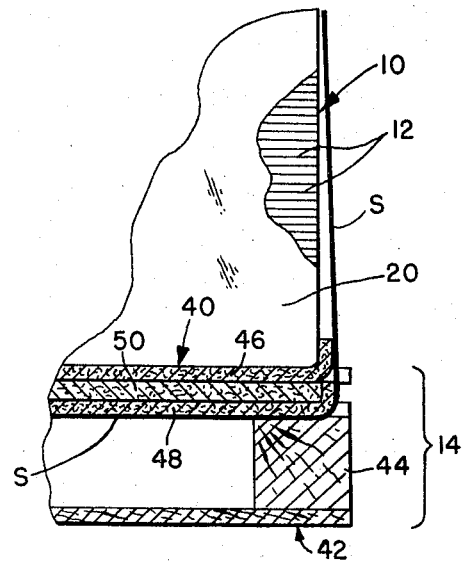
FIG. 9 is an enlarged sectional view taken substantially on the vertical plane indicated by the line 9—9 of FIG. 8.
Figure 7:
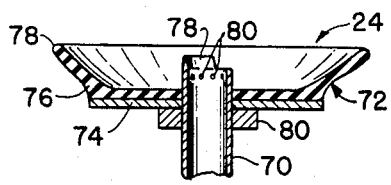
FIG. 7 is an enlarged sectional view taken substantially centrally and longitudinally through a vacuum chuck employed in connection with the present invention.

Referring now to FIG. 9, it will be observed that during the tensioning operation upon the strapping, limited regions of the overhanging portions of the upper and lower sheets 46 and 48 of the composite platform 40 will be drawn upwardly as indicated at 120 so as to constitute corner protectors for the lowermost several sheets or articles 12 of the stack. These corner protectors 120 may or may not become sheared in their entirety from the general planes of the sheets 46 and 48 but, if desired, the sheets may be pre-scored or otherwise weakened along pairs of lines which extend inwardly from the margins of the sheets and which are spaced apart by a distance slightly greater than the width of the strapping material S. When such scoring is resorted to, the corner protectors 120 will become completely sheared from the planes of the sheets 46 and 48 along their side edges.

It is pointed out that during the actual vacuumizing operation, very appreciable height reduction in the stack 10 may be accomplished, depending, of course, upon the nature of the commodity undergoing packaging. This height reduction may, under certain circumstances amount to as much as 50%. Upon initial application of vacuum to the envelope 20, an almost immediate vertical compression will be applied to the stack and this ordinarily would have the effect of causing a bulging of the sides of the envelope. However, with strong suction in effect, this bulge is rapidly dissipated or consumed with the net effect that the envelope 20 closely hugs the sides of the stack 10 throughout substantially the entire vacuumizing operation. After an initial amount of evacuation has taken place and the stack is reduced approximately to its final dimensions, an ultimate molecular evacuation takes place wherein air is drawn from the interstices of the fibrous material of the commodity and a degree of height reduction which is not possible with conventional power press compression methods.

The invention is not to be limited to the exact method steps nor to the particular evacuation and strapping equipment shown and described herein as various modifications thereof are contemplated. For example, while the invention has been shown and described in connection with the packaging of a commodity which offers appreciably greater resistance to lateral compression than to vertical compression, it is within the purview of the present invention to modify either the method, the equipment employed in connection therewith, or both, to adapt the method to the packaging of commodities which are readily compressible in all directions as is the case with the packaging of wool batts or skeins, or other similar articles too numerous to mention. Therefore, only insofar as the invention has particularly been pointed out in the accompanying claims is the same to be limited.

Having thus described my invention, what I claim and desire to secure by Letters Patent is:

1. The method of packaging a group of collectively compressible articles which comprises: surrounding the group with a collapsible enclosure of substantially air-impervious material, connecting the interior of the enclosure to a source of air under sub-atmospheric pressure to collapse the enclosure upon the group and thus compress the same and reduce the overall volume thereof, maintaining the interior of the enclosure connected to said source to overcompensate for possible air infiltration into the interior of the enclosure while at the same time binding the group, together with its surrounding enclosure with strapping material under tension, and finally disconnecting the interior of the enclosure from said source of sub-atmospheric air.

2. The method of packaging a group of collectively compressible articles as set forth in claim 1, wherein the step of surrounding the group with a collapsible enclosure consists in positioning a film of flexible substantially air-impervious sheet material about the group so as to cover at least the top and sides thereof.

3. The method of packaging a group of collectively compressible articles as set forth in claim 1, wherein the group of articles is in the form of a rectangular hexahedral stack of superimposed articles, and in which the step of surrounding the group with a collapsible enclosure consists in positioning a film of flexible substantially air-impervious sheet material about the stack so as to cover at least the top and four vertical sides thereof so that upon connecting the interior of the enclosure to said source of sub-atmospheric pressure the film will be shrunk in centripetal fashion upon the stack to compress the same vertically and decrease the height thereof while at the same time rigidifying the group.

4. The method of packaging a group of collectively compressible articles as set forth in claim 1, wherein the group of articles is in the form of a rectangular hexahedral stack of superimposed articles, and in which the step of surrounding the group with a collapsible enclosure consists in positioning the stack upon a flat rectangular substantially air-impervious pallet platform, positioning a film of flexible substantially air-impervious sheet material about the stack so as to cover the top and four vertical sides thereof, and causing the film to be sealed coextensively to the peripheral region of the platform.

5. The method of packaging a group of collectively compressible articles as set forth in claim 1, wherein the group of articles is in the form of a rectangular hexahedral stack of superimposed articles, and in which the step of surrounding the group with a collapsible enclosure consists in positioning the stack upon a flat rectangular substantially air-impervious platform, telescoping an inverted open-ended bag-like film of substantially air-impervious material over said stack and causing the lower rim region thereof to make substantially coextensive sealing contact with the marginal edge regions of the platform.

References Cited

UNITED STATES PATENTS 3,218,778  11/1965  Moreland _____ 100—90 X
3,307,319  3/1967  Christensen et al. ____ 53—24 X TRAVIS S. McGEHEE, *Primary Examiner.*

R. L. FARRIS, *Assistant Examiner.*

U.S. Cl. X.R.

53—27; 100—3, 25, 90